(12) United States Patent
Müller

(10) Patent No.: US 7,748,217 B2
(45) Date of Patent: Jul. 6, 2010

(54) SYSTEM AND METHOD FOR MODELING OF TURBO-CHARGED ENGINES AND INDIRECT MEASUREMENT OF TURBINE AND WASTE-GATE FLOW AND TURBINE EFFICIENCY

(75) Inventor: Martin Müller, Ann Arbor, MI (US)

(73) Assignee: Delphi Technologies, Inc., Troy, MI (US)

( * ) Notice: Subject to any disclaimer, the term of this patent is extended or adjusted under 35 U.S.C. 154(b) by 243 days.

(21) Appl. No.: 11/867,422

(22) Filed: Oct. 4, 2007

(65) Prior Publication Data

US 2009/0094009 A1    Apr. 9, 2009

(51) Int. Cl.
 *F02D 23/00* (2006.01)
(52) U.S. Cl. .......................... 60/602; 60/600
(58) Field of Classification Search ............ 60/600, 60/602
 See application file for complete search history.

(56) References Cited

U.S. PATENT DOCUMENTS

| | | | | |
|---|---|---|---|---|
| 6,393,903 | B1 * | 5/2002 | Reed et al. ............... | 73/114.01 |
| 6,732,523 | B2 | 5/2004 | Birkner et al. | |
| 6,898,933 | B2 * | 5/2005 | Klingseis ..................... | 60/602 |
| 6,904,353 | B1 * | 6/2005 | Kolavennu et al. ............ | 60/602 |
| 7,047,740 | B2 * | 5/2006 | Fukasawa et al. ............. | 60/602 |
| 7,412,965 | B1 * | 8/2008 | Laermann et al. ............. | 60/602 |
| 7,509,803 | B2 * | 3/2009 | Panciroli ..................... | 60/600 |
| 7,540,148 | B2 * | 6/2009 | Wild et al. ................... | 60/602 |
| 2008/0243352 | A1 * | 10/2008 | Healy ........................ | 701/100 |

OTHER PUBLICATIONS

G. Schopp, et al., "Model Based Engine Control Function for Turbocharged Gasoline Engines", Translation by USPTO on Aug. 2009, Published in German by 14th Aachen Colloquium on Vehicle and Engine Technology, 2005, pp. 1143-1170.*
SAE Technical Paper Series, 2001-01-0553, "Dynamic EGR Estimation for Production Engine Control," Martin Muller, Peter M. Olin and Bart Schreurs, SAE 2001 World Congress, Detroit, MI, Mar. 5-8, 2001.
SAE Technical Paper Series, 980784, "Mean Value Modelling of Turbocharged Spark Ignition Engines," Martin Muller, Elbert Hendricks and Spencer C. Sorenson, Int'l Congress and Exposition, Detroit, MI, Feb. 23-26, 1998.

(Continued)

*Primary Examiner*—Thomas E. Denion
*Assistant Examiner*—Mary A Davis
(74) *Attorney, Agent, or Firm*—Thomas N. Twomey

(57) ABSTRACT

A real-time system for modeling a turbo-charged engine includes a model configured to estimate various exhaust states such as turbine inlet pressure, turbine outlet pressure, turbine outlet temperature, turbine mass flow rate and waste-gate valve mass flow rate. The model is dependent only on the availability of normal operating values available in a conventionally-configured automotive controller and one or more measured intake side parameters such as ambient pressure, boost pressure, ambient temperature and compressor mass flow rate. The model is constructed to reflect a high-level application of energy conservation between the turbine (generated power) and compressor (absorbed power). A method for the indirect measurement of turbine and waste-gate flow uses turbine inlet and outlet pressure, inlet temperature and engine mass air flow rate measurements. A method for the indirect measurement of turbine efficiency avoids the need for manufacturer's turbine data.

27 Claims, 4 Drawing Sheets

OTHER PUBLICATIONS

Aachener Kolloquium Fahrzeug—und Motorentechnik 2005, Modellbasierte Motorsteuerungsfunktion fur aufgeladene Ottomotoren, "Model Based Control Function for Turbo Charged Spark Ignition Engines," Dr. Gerhard Schopp, Dr. Roland Schwarz, Dr. Thomas Burkhardt, Dipl.-Ing. Achim Koch, Dipl.-Ing. Bjorn Miener, Siemens VDO Automotive AG, Regensburg.

* cited by examiner

SYSTEM AND METHOD FOR MODELING OF TURBO-CHARGED ENGINES AND INDIRECT MEASUREMENT OF TURBINE AND WASTE-GATE FLOW AND TURBINE EFFICIENCY

TECHNICAL FIELD

The present invention relates to a system and method for modeling of turbo-charged engines to estimate various exhaust parameters as well as to provide an indirect measurement of waste-gate and turbine flow and turbine efficiency.

BACKGROUND OF THE INVENTION

A turbo-charged internal combustion engine includes additional components and physical processes in both the intake and exhaust stream. On the intake side of the engine, a centrifugal compressor and intercooler are provided and are located between the air cleaner and a throttle valve. On the exhaust side, a turbine and a waste-gate—which defines a parallel exhaust stream path with the turbine—are both located between the exhaust manifold and the catalyst/muffler. It is known to provide an engine management system (EMS) configured to control the operation of a turbo-charged engine. However, such an EMS is conventionally configured to perform its functions with only a minimal amount of additional information, notwithstanding the increased system complexity, in order to maintain reduced costs (i.e., by reducing the number of sensors). Conventionally, the additional sensors added when an engine is turbo-charged are all located on the intake side (e.g., a boost pressure sensor, and a boost temperature sensor). The foregoing lack of sensors on the exhaust side, however, means that the exhaust states, such as exhaust manifold pressure and turbine outlet pressure and temperature, must be estimated. Conventional estimation logic for a turbo-charged engine is substantially more complex than the relatively simple models that are known and adequate for a naturally aspirated engine.

The existing EMS logic for naturally-aspirated engines have models for determining various exhaust manifold states, such as exhaust manifold pressure $P_{EM}$ and exhaust manifold temperature $T_{EM}$. A known use of $P_{EM}$ is as an input for estimating volumetric efficiency (VE), pumping torque and EGR flow as well as for related control. A known use of $T_{EM}$ is for estimation of the pressure drop over the exhaust system, catalyst temperature estimation and control, and exhaust gas recirculation (EGR) flow estimation and control.

The conventional models for determining $T_{EM}$ are the same for a turbo-charged engine as for a naturally aspirated engine. On a turbo-charged engine, the exhaust temperature is the same temperature as the exhaust gas entering the turbine $T_{T,in}$. However, there is a temperature drop associated with the expansion-work process that occurs across the turbine, while there is no temperature drop due to expansion-work across the waste-gate path. Furthermore, it is unknown what amount of the exhaust gas flows through the turbine, on the one hand, versus how much flows through the parallel waste-gate path, on the other hand. It is desirable to have accurate information regarding the various exhaust manifold states for a variety of purposes, including those described above, and further including control of the waste-gate valve.

One approach taken in the art is described in Schopp et al, *Model Based Control Function For Turbo Charged Spark Ignition Engines*, Aachener Kolloquium Fahrzeug-und Motorentechnik 2005 (2005) (hereinafter referred to as "Schopp"). Schopp discloses an approach that models the exhaust manifold pressure state by the filling and emptying of the exhaust manifold. The model in Schopp, however, not only requires a so-called compressor characteristic map, which as known is generally available from the turbo-charger manufacturer, the Schopp model also requires the turbine map, which is more difficult to obtain, and is of questionable validity since it is measured at steady-state conditions, while the conditions on a real-world engine are pulsating. Moreover, another disadvantage of the Schopp model is that it may become unstable, especially near its limit of operation, and accordingly special care is required in configuring it for use, which makes any actual implementation challenging.

There is therefore a need for a system and method for modeling a turbo-charged engine that minimizes or eliminates one or more of the problems set forth above.

SUMMARY OF THE INVENTION

A system for modeling a turbo-charged internal combustion engine is suitable for real-time implementation in an electronic controller of an automotive vehicle. In one embodiment, the system includes a model implemented in the controller configured to estimate various exhaust states such as the turbine inlet pressure ($P_{T,in}$), the turbine outlet pressure ($P_{T,out}$), the turbine outlet temperature ($T_{T,out}$), the turbine mass flow rate ($\dot{m}_T$) and the waste-gate valve mass flow rate ($\dot{m}_{WG}$). The invention, in providing these estimations, is dependent only on normal operating values available in a conventionally-configured automotive controller and one or more measured intake side parameters such as ambient pressure ($P_{amb}$), compressor outlet pressure ($P_{Boost}$), ambient temperature ($T_{amb}$) and compressor mass flow rate ($\dot{m}_C$). While the model utilizes energy conservation principles between compressor and turbine (i.e., power absorbed equals the power produced), embodiments of the invention may nonetheless be easily implemented using just the compressor characteristics map—information typically provided by the turbo-charger manufacturer, avoiding the need for a turbine map, which is typically not provided by a turbo manufacturer. Finally, the invention provides the means for indirectly measuring the mass flow rate through the waste-gate and turbine of the turbo-charger as well as the turbine isentropic efficiency.

A method according to the invention is suitable for use in an internal combustion engine having a turbo-charger with a compressor and an exhaust driven turbine with a waste-gate. In one preferred embodiment, a method of estimating an exhaust parameter includes a number of steps. The initial steps involve establishing a first data structure correlating turbine pressure ratio ($Pr_T$) with turbine isentropic efficiency ($\eta_T$), establishing a second data structure correlating corrected turbine mass flow rate ($\dot{m}_{T,cor}$) with turbine pressure ratio ($Pr_T$), and establishing a third data structure correlating a turbine power and boundary term (A*B) with corrected turbine mass flow rate ($\dot{m}_{T,cor}$).

The next step involves determining a power level ($P_C$) absorbed by the compressor using predetermined compressor characteristic map data and measured intake parameters. Next, determining a value for the turbine isentropic efficiency ($\eta_T$) using the first data structure. The next step involves determining a value for the turbine power and boundary term (A*B) in accordance with the determined absorbed power level and the determined value for turbine efficiency ($\eta_T$). Next, determining a value for the corrected turbine mass flow rate ($\dot{m}_{T,cor}$) using the third data structure and the determined turbine power and boundary term (A*B). Finally, the method involves determining a value for the turbine pressure ratio ($Pr_T$) using the second data structure in accordance with the determined value for the corrected turbine mass flow rate ($\dot{m}_{T,cor}$). An additional step of the method involves calculating the turbine mass flow rate ($\dot{m}_T$) using the corrected turbine mass flow rate ($\dot{m}_{T,cor}$) and a predefined equation.

One important use for the turbine pressure ratio ($Pr_T$), calculated above, is to use it in calculating the turbine input pressure $P_{T,in}$, which is the same as the exhaust manifold pressure, $P_{EM}$, which as described above can be used as an input for estimating volumetric efficiency (VE), pumping torque and EGR flow as well as for related control.

Other features, object and advantages of the present invention are also presented.

BRIEF DESCRIPTION OF THE DRAWINGS

The present invention will now be described by way of example, with reference to the accompanying drawings.

DETAILED DESCRIPTION OF THE PREFERRED EMBODIMENT

Figure 1:
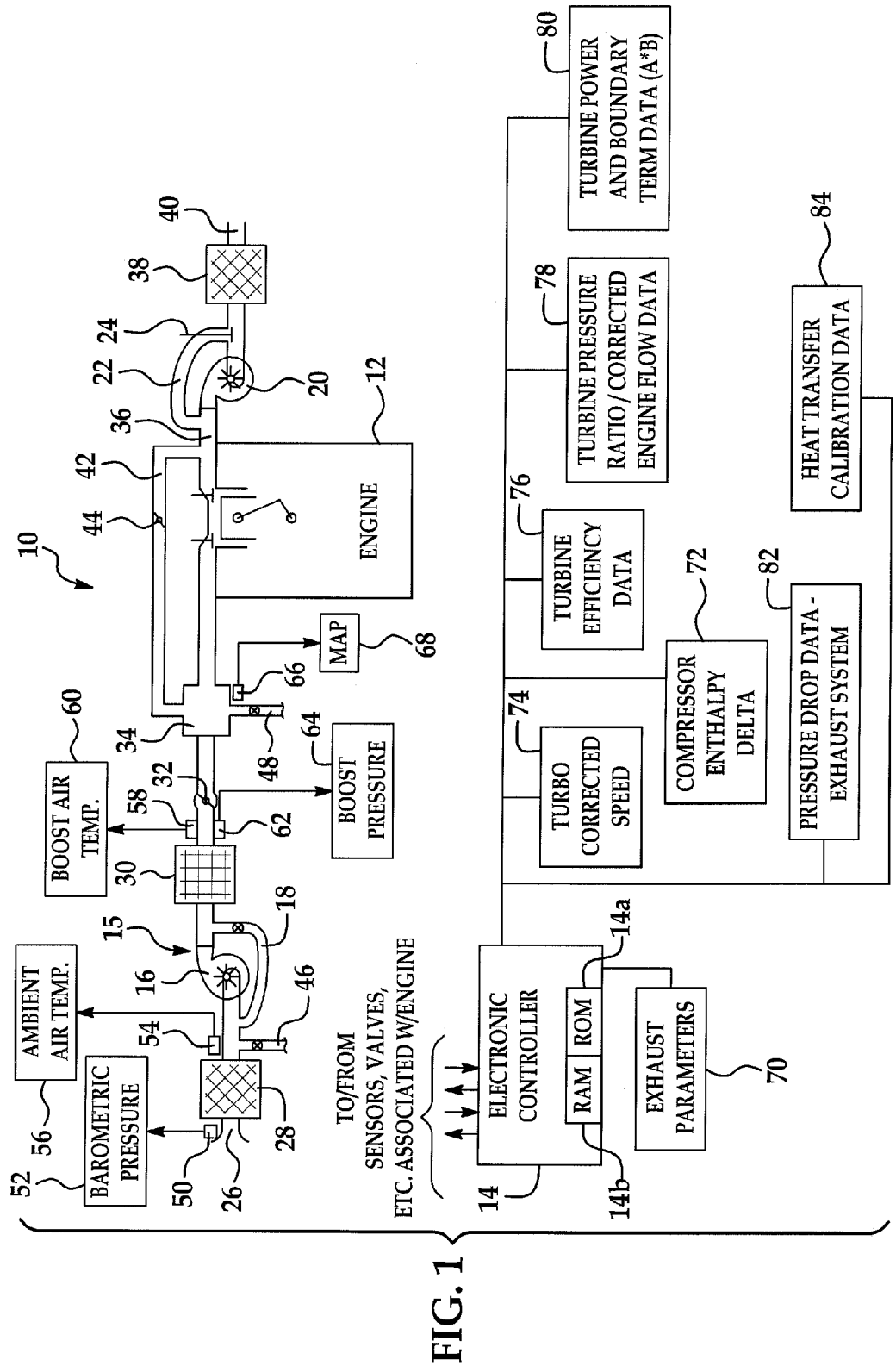
FIG. 1 is simplified diagrammatic and block diagram of a turbo-charged engine system having a controller configured to model the turbo-charged engine.

Referring now to the drawings wherein like reference numerals are used to identify identical components in the various views, FIG. 1 is a diagrammatic view of a turbo-charged internal combustion engine system 10 configured in accordance with the present invention. The system 10 includes an internal combustion engine 12 controlled by an electronic engine controller 14 all in accordance with the present invention.

Engine 12 may be a spark-ignition engine that includes a number of base engine components, sensing devices, output systems and devices, and a control system. Alternatively, the present invention may be used with compression-ignition engines, such as diesel or the like.

Generally, electronic controller 14 is configured via suitable programming to contain various software algorithms and calibrations, electrically connected and responsive to a plurality of engine and vehicle sensors, and operably connected to a plurality of output devices. Controller 14 includes at least one microprocessor or other processing unit, associated memory devices such as read only memory (ROM) 14a and random access memory (RAM) 14b, input devices for monitoring input from external analog and digital devices, and output drivers for controlling output devices. In general, controller 14 is operable to monitor engine operating conditions and operator inputs using the plurality of sensors, and control engine operations with the plurality of output systems and actuators, using pre-established algorithms and calibrations that integrate information from monitored conditions and inputs. The software algorithms and calibrations which are executed in electronic controller 14 may generally comprise conventional strategies known to those of ordinary skill in the art. These programmed algorithms and calibrations are configured, when executed, to monitor the engine operating conditions and operator demands using the plurality of sensors, and control the plurality of engine actuators accordingly. The software algorithms and calibrations are preferably embodied in pre-programmed data stored for use by controller 14.

System 10 further includes a turbo-charger 15 having a compressor 16, which may include a compressor recirculation path 18, and an exhaust gas driven turbine 20, which includes a parallel waste-gate flow path 22. As known, the compressor is driven by the turbine, and the amount of boost is controlled principally by a waste-gate control mechanism (e.g., valve) shown schematically as a waste-gate valve 24. For purposes of the present invention, the waste-gate valve 24 may be actuated through any of several waste-gate actuation mechanizations, including but not limited to (1) pneumatic actuation of the waste-gate valve using boost pressure as an actuation source, which may or may not have a solenoid under the control of the controller 14 adjusting the amount of boost pressure routed to the actuator; (2) pneumatic actuation of the waste-gate valve using vacuum from a vacuum pump as the actuation source, which will have a solenoid under the control of the controller 14 adjusting the amount of vacuum routed to the actuator; and (3) an electrically controlled waste-gate valve (i.e., where the waste-gate valve is directly moved by an electric motor or the like under the control of controller 14).

On the air intake side of the engine 12, FIG. 1 shows an air intake port 26, an air filter 28, an intercooler 30 configured to cooperate with and complement compressor 16, a throttle valve 32, and an intake manifold 34. These features are well known and understood in the art. In the context of the present invention, these features may comprise conventional implementations.

On the exhaust side of the engine 12, FIG. 1 shows an exhaust gas manifold 36. Additionally, various downstream exhaust components are conventionally included in system 10, such as a catalytic converter and a muffler, and are shown schematically as a single exhaust restriction block 38, which feeds into exhaust gas outlet 40. These features are well known and understood in the art. In the context of the present invention, these features may comprise conventional implementations.

Conventionally, a variety of feedback paths are provided in system 10. For example, FIG. 1 shows an exhaust gas recirculation (EGR) tube or the like coupled between the exhaust manifold 36 and the intake manifold 34, and whose flow path is adjusted by way of an EGR valve 44. As known, the EGR valve 44 may be controlled by the electronic controller 14 in accordance with conventional EGR algorithms configured to achieve predetermined performance criteria. Generally, varying the position of the valve 44 alters the amount of exhaust gas that is provided to the intake manifold 34 for mixing with intake air, fuel and the like destined for combustion in engine 12.

With continued reference to FIG. 1, additional feeds may also be provided. For example, evaporative emissions control and diagnostics generally call for an evaporative ("evap") emissions canister (not shown) be provided in an automotive vehicle that includes system 10. The evap canister is coupled to a fuel tank (not shown) as well as to inlets 46 and 48 by a combination of vent, purge and check valves, all as known in the art. For purposes of the present invention, however, the impact of these features may be ignored while the evap emissions and control system is not in operation (i.e., when not performing a purge cycle or a diagnostic cycle).

FIG. 1 also shows a variety of sensors deployed on the intake side of the engine 12, including an ambient or barometric pressure sensor 50 configured to produce a barometric pressure signal 52, an ambient air temperature sensor such as an intake air temperature (IAT) sensor 54 configured to generate an IAT signal 56, a boost air temperature sensor 58 configured to generate a boost air temperature signal 60, a boost pressure sensor 62 configured to generate a boost pressure signal 64, and an intake manifold pressure sensor such as a manifold absolute pressure (MAP) sensor 66 configured to generate a MAP signal 68. These sensors and their functioning are all well known and understood in the art. For purposes of the present invention, these sensors may all comprise conventional components.

As described in the Background, in systems that include a turbo-charger 15, as compared to a naturally aspirated engine, the engine management system (EMS) implemented in electronic controller 14 must perform all its normal calculations and control functions, but is also configured to control, among other things, the amount of boost provided by the turbo-charger. To reduce costs, conventional hardware implementations only provide additional sensors on the air intake side of the engine (e.g., boost pressure sensor and temperature). However, in the absence of one or more sensors for direct measurement, there is a need to estimate the values of various exhaust states or parameters, such as the exhaust manifold pressure and turbine outlet pressure and temperature. These exhaust states are shown in FIG. 1 in block form as exhaust states 70. It should be understood that this representation is not meant to mean necessarily that these exhaust parameters are communicated physically outside of the controller 14, however.

As will be described in greater detail below, the present invention employs various data tables or the like to store required data, including but not limited to a compressor enthalpy delta data table 72 (sometimes referred to herein as "Table1"), a turbo-charger corrected rotational speed data table 74 (sometimes referred to herein as "Table2"), a turbine isentropic efficiency data table 76 (sometimes referred to herein as "Table3"), a turbine pressure ratio/corrected engine flow data table 78 (sometimes referred to herein as "Table4"), a turbine power and boundary term (A*B) data table 80 (sometimes referred to herein as "Table5"), an exhaust pressure drop data table 82 (sometimes referred to herein as "Table6"), and a heat transfer calibration data table 84 (sometimes referred to herein as "Table7").

A chart setting forth a listing of the various terms used in the following equations has been set forth at the end of this specification.

As described in the Background, existing EMS logic implemented in the controller 14 for naturally aspirated engines have models that estimate a number of exhaust manifold states, such as exhaust manifold pressure $P_{EM}$ and exhaust manifold temperature $T_{EM}$. A typical use of $P_{EM}$ is as dependency for volumetric efficiency and pumping torque estimation and exhaust gas recirculation (EGR) flow estimation and control. A typical use of $T_{EM}$ is for estimation of the pressure drop over the exhaust system, catalyst temperature estimation, and EGR flow estimation and control.

The conventional models describing $T_{EM}$ are the same for a turbo-charged engine as for a naturally aspirated engine. On a turbo-charged engine, the exhaust manifold temperature is the same as the temperature of the exhaust gas entering the turbine $T_{T,in}$.

However, there is a temperature drop associated with the expansion-work process across the turbine while there is no temperature drop across the waste-gate path. Furthermore, it is unknown how much of the total exhaust gas flows through the turbine, on the one hand, versus how much of the total exhaust gas flows across the parallel waste-gate path, on the other hand. Finally, there is also a temperature drop due to heat transfer.

A model is therefore required to estimate the turbine outlet temperature $T_{T,out}$. Such a model requires as inputs the values for the individual flows across the turbine $\dot{m}_T$, waste-gate $\dot{m}_{WG}$ and exhaust system $\dot{m}_{exh}$. Since there is a simple relationship between the three flows, namely, $\dot{m}_{WG}=\dot{m}_{exh}-\dot{m}_T$ and the exhaust system flow $\dot{m}_{exh}$ is a known value for conventional engine management systems (i.e., $\dot{m}_{exh}=\dot{m}_{eng}-\dot{m}_{EGR}$), the need is to develop a model of the turbine flow $\dot{m}_T$.

Existing models describing the pressure ratio $Pr_{exh}$ of the exhaust system (i.e., consisting of the catalytic converter and the muffler) are also valid for a turbo-charged engine. However, when used for a naturally aspirated engine, it gives the exhaust manifold pressure estimate: $P_{EM}=Pr_{exh}*Baro$. This is not the case for a turbo-charged engine, because there is a substantial pressure drop across the turbine and waste-gate. Therefore, a turbo-charged engine needs to furthermore model the turbine pressure ratio $Pr_T$ resulting in $P_{EM}=Pr_T*Pr_{exh}*Baro$.

In summary, it is necessary to develop, and the present invention provides, a model of the turbine flow, turbine pressure ratio $Pr_T$ and turbine outlet temperature $T_{T,out}$ for a turbo-charged engine. Thus, the remainder of the specification is broken up into three main sections: (1) deduction of governing equations and data structures for estimating $\dot{m}_T$ and $Pr_T$; (2) deduction of governing equations and data structures for estimating $T_{T,out}$; and (3) deduction of governing equations for indirect measurement of the turbine and waste-gate flow rates and turbine efficiency.

Deduction of $\dot{m}_T$ and $Pr_T$

The power absorbed by the compressor, $P_C$, is well known and is set forth in equation (1a) below:

$$P_C = \dot{m}_C * \Delta h_C \quad (1a)$$

Where $\dot{m}_C$ is the compressor mass flow rate; and
$\Delta h_C$ is the compressor enthalpy delta.

The compressor enthalpy delta, $\Delta h_C$, in turn, is set forth in equation (1b) below:

$$\Delta h_C = \frac{1}{\eta_C} c_{p,air} T_{C,in} [(Pr_C)^{(k_{air}-1)/k_{air}} - 1] \quad (1b)$$

Where $\eta_C$ is the compressor isentropic efficiency;
$c_{p,air}=c_p^a$ is the specific heat at constant pressure for air;
$T_{C,in}$ is the compressor inlet air stagnation temperature;
$Pr_C$ is the compressor pressure ratio; and
$k_{air}$ is the ratio of specific heats for air.

Moreover, the compressor pressure ratio, $Pr_C$, set forth in equation (1b) may be expressed as set forth in equation (1c) below:

$$Pr_C = \frac{P_{C,out}}{P_{C,in}} \quad (1c)$$

Where $P_{C,in}$ is the compressor inlet stagnation pressure; and
$P_{C,out}$ is the compressor outlet stagnation pressure.

It should be understood that the compressor inlet and outlet pressures may be described as set forth in equations (1d) and (1e) below:

$$P_{C,in} = P_{amb} - \Delta P_{Airfilter} \quad (1d)$$

$$P_{C,out} = P_{Boost} + \Delta P_{Intercooler} \quad (1e)$$

Where $P_{amb}$ is the ambient pressure;

$\Delta P_{Airfilter}$ is the air filter pressure drop;

$P_{Boost}$ is the boost pressure (measured after the intercooler, before the throttle); and $\Delta P_{Intercooler}$ is the intercooler pressure drop.

It is common practice for manufacturers of turbo-chargers to make the following data available: $\dot{V}_{C,cor}$, $Pr_C$, $\dot{N}_{T,cor}$, $\eta_C$ at a specified $T_{C,in}^{reference}$, $P_{C,in}^{reference}$, where $\dot{V}_{C,cor}$ is the corrected compressor volume flow rate, $\dot{N}_{T,cor}$ is the corrected turbo-charger rotational speed and $T_{C,in}^{reference}$, $P_{C,in}^{reference}$ are the reference compressor inlet air stagnation temperature and reference compressor inlet air stagnation pressure, respectively. This data is what is referred to herein as the compressor characteristics map. While one of ordinary skill in the art will understand the form of the data commonly available, for the sake of clarity, and for example purposes only, a turbo-charger manufacturer may provide a map/diagram that graphically illustrates the compressor isentropic efficiency $\eta_C$ (e.g., as rings or partial rings indicating various efficiency levels such as 50%, 60%, 70%, 72%, 75%, etc.) on an X-Y chart where the X-axis is the corrected volume (air) flow rate and the Y-axis is the compressor pressure ratio. Overlaying the efficiency level rings may be a series of traces, generally offset from each other, with each indicating a respective turbo-charger corrected speed. It should be understood, however, that other forms of data or information may be available, including without limitation data in electronic format. Moreover, while it is preferred, due to convenience primarily, that such manufacturer-provided data concerning the compressor be used, it should be understood that independent measurements and characterization of the compressor of a turbo-charger may be employed to obtain the same information as described above, without any limitation of the present invention.

The compressor enthalpy delta, $\Delta h_C$, may be expressed as a function of the corrected air flow rate and the corrected turbo-charger rotational speed, and is as set forth in equation (1f) below. Once the compressor enthalpy delta $\Delta h_C$ has been determined, then the power absorbed by the compressor, $P_C$ may be determined, as described in equation (1a) above.

$$\Delta h_C = \text{Table1}(\dot{V}_{C,cor}, \dot{N}_{T,cor}) \tag{1f}$$

Where $$\dot{N}_{T,cor} = \text{Table2}(\dot{V}_{C,cor}, Pr_C); \text{ and} \tag{1g}$$

$$\dot{V}_{C,cor} = \dot{m}_C * \frac{T_{C,in} R}{P_{C,in}} * \sqrt{\frac{T_{C,in}^{reference}}{T_{C,in}}} \tag{1h}$$

Where R is the well known gas constant.

The values in tables 72 and 74 ("Table1" and "Table2" in the equations) are preferably calculated and stored in advance of real-time execution by electronic controller 14. Specifically, both tables 72 and 74 may be populated in advance using the compressor characteristic map described above and the equations (1a) through (1f).

More particularly, the compressor enthalpy delta (Δh) table 72 is a table that takes as inputs the corrected compressor volume flow rate ($\dot{V}_{C,cor}$) and the corrected turbo-charger rotational speed ($\dot{N}_{T,cor}$) and provides as an output a value for the compressor enthalpy delta (i.e., change in enthalpy of the gas across the compressor). Table 72 may be populated using the data conventionally available from the turbo manufacturers characterizing the compressor, as well as the equation (1b).

Additionally, the corrected turbo-charger rotational speed ($\dot{N}_{T,cor}$) table 74 is a table that takes as inputs the corrected compressor volume flow rate ($\dot{V}_{C,cor}$) and the compressor pressure ratio ($Pr_C$), and provides as an output the corrected turbo-charger rotational speed ($\dot{N}_{T,cor}$). Table 74 may be populated by using the data conventionally available from the turbo manufacturer characterizing the compressor.

During real-time execution by electronic controller 14, the dependencies in the above equations are, generally speaking, satisfied either through direct measurement via a sensor or through calculation via conventional algorithm, as will now be described.

First, equation (1h) is evaluated to obtain a value for the corrected volume flow rate. The dependencies in the right hand side of equation (1h) can be met either through direct sensor measurement or via estimation. For example, $T_{C,in}^{reference}$ and R will be known, $T_{C,in} \cong T_{amb}$ will be known via measurement by intake air temperature (IAT) sensor 54, $P_{C,in}$ will be known via measurement by ambient pressure sensor 50 ($P_{amb}$) as modified by $\Delta P_{Airfilter}$ (i.e., using equation (1d)), and the mass air flow $\dot{m}_C$ will be known either via measurement by an air meter (e.g., mass air flow sensor or MAF sensor—not shown) typically placed just upstream of the compressor 16, or, in an alternate embodiment, calculated by the well known speed-density equation, for example as set forth in U.S. Pat. No. 6,393,903 entitled VOLUMETRIC EFFICIENCY COMPENSATION FOR DUAL INDEPENDENT CONTINUOUSLY VARIABLE CAM PHASING to Reed et al., assigned to the common assignee of the present invention, and incorporated herein by reference in its entirety. It should be understood that the pressure drops across the air filter 28 and intercooler 30, $\Delta P_{Airfilter}$ and $\Delta P_{Intercooler}$ respectively, may be empirically determined by characterizing such pressure drops as a function of engine flow.

Next, equation (1g) is evaluated to obtain a value for the corrected turbo rotational speed ($\dot{N}_{T,cor}$). The inputs needed for use of the corrected rotational speed data table 74 ("Table2") are the corrected volume flow rate $\dot{V}_{C,cor}$, which can be calculated from equation (1h) and the compressor pressure ratio Pro, which can be calculated from equation (1c). The compressor inlet pressure $P_{C,in}$ has already been calculated in evaluating equation (1h). The compressor outlet pressure $P_{C,out}$ may be determined using equation (1e). $P_{Boost}$ conventionally measured directly via a boost pressure sensor 62 ("boost pressure"), as modified by $\Delta P_{Intercooler}$ (per equation (1e)), will yield $P_{C,out}$. The compressor pressure ratio $Pr_C$ is then calculated, thus allowing equation (1g) to be evaluated to obtain a value for $\dot{N}_{T,cor}$.

Next, equation (1f) is evaluated to obtain a value for the compressor enthalpy delta $\Delta h_C$, using the just-determined values for $\dot{V}_{C,cor}$ and $\dot{N}_{T,cor}$.

Finally, equation (1a) is evaluated, using the value of the compressor enthalpy delta $\Delta h_C$ and the mass flow rate $\dot{m}_C$, to obtain a value of the power absorbed by the compressor $P_C$.

Likewise, the power produced by the turbine, $P_T$, is also well known in the art, and is set forth in equation (2) below:

$$P_T = \dot{m}_T \eta_T c_{p,exh} T_{T,in} [1 - (Pr_T)^{((1-k_{exh})/k_{exh})}] \tag{2}$$

Where $\dot{m}_T$ is the turbine mass flow rate;

$\eta_T$ is the turbine isentropic efficiency;

$c_{p,exh} = c_p^e$ is the specific heat at constant pressure for exhaust;

$T_{T,in}$ (=$T_{EM}$) is the turbine inlet stagnation temperature;

$$Pr_T = \frac{P_{T,in}}{P_{T,out}}$$

is the turbine pressure ratio; and $k_{exh}$ is the ratio of specific heats for exhaust.

At steady-state, energy conservation gives $P_T=P_C$ utilizing that the mechanical efficiency of the turbo-charger is relatively high and is included in the data for the isentropic turbine efficiency $\eta_T$, which results in equation (3) below:

$$P_C = \dot{m}_T \eta_T c_{p,exh} T_{T,in}[1-(Pr_T)^{((1-k_{exh})/k_{exh})}]. \quad (3)$$

Figure 2:
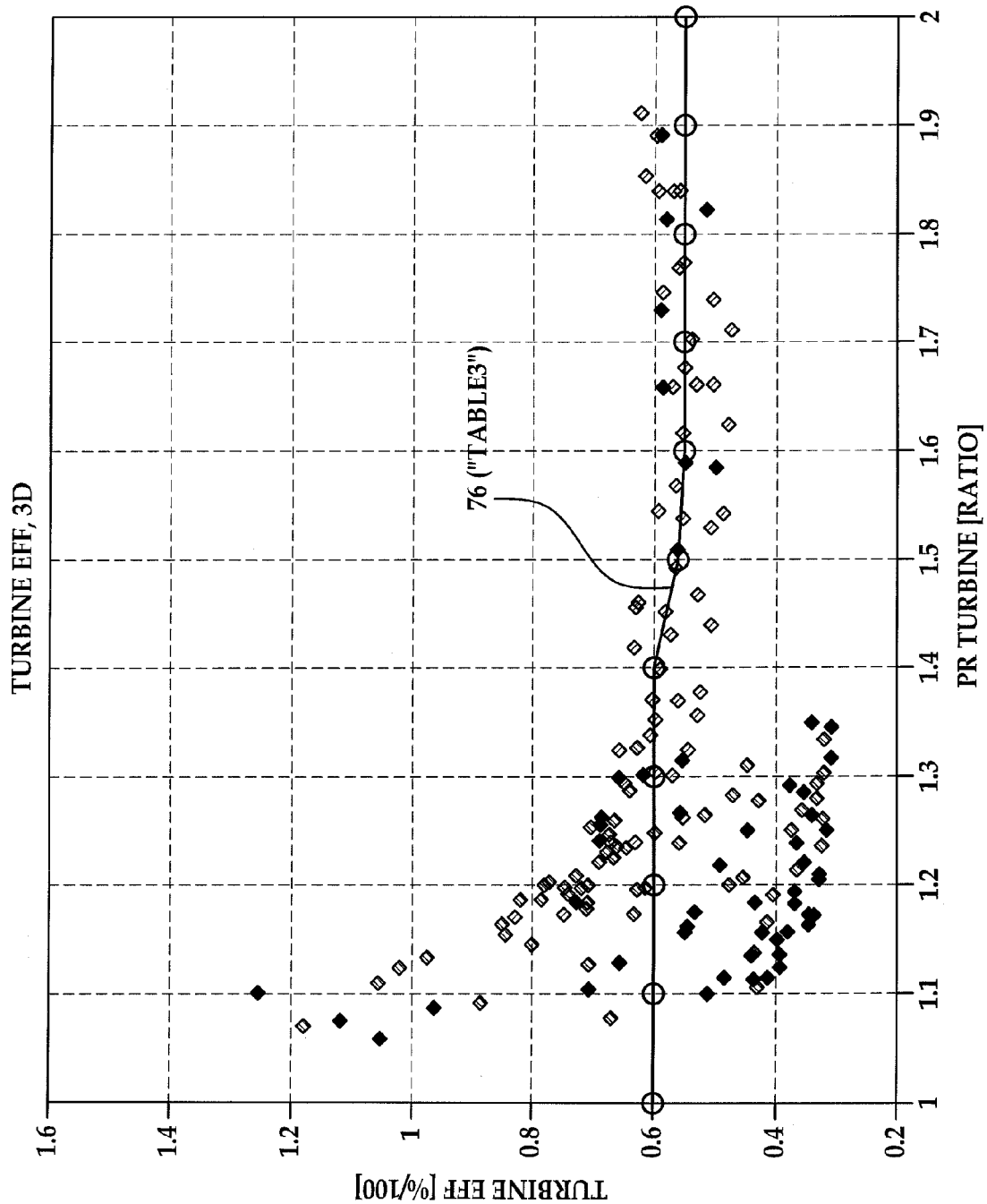
FIG. 2 is a diagram showing turbine isentropic efficiency as a function of turbine pressure ratio.

FIG. 2 is a chart showing turbine isentropic efficiency as a function of turbine pressure ratio, as observed in several turbo-charged engines. FIG. 2 shows that a simple model of the turbine isentropic efficiency $\eta_T$ is adequate for the present invention, $\eta_T$ being determined as set forth in equation (4) below.

$$\eta_T = \text{Table3}(Pr_T) \quad (4)$$

For the purpose of $Pr_T$ estimation, accuracy is only required for the higher pressure ratios, and it is seen that the data collapses well for $Pr_T > 1.3$. It is noted that the $\eta_T$ model dependency on $Pr_T$ makes the overall model of $P_{EM}$ implicit, but this is avoided by utilizing that the range of $\eta_T$ is well defined and that its $Pr_T$ dependency is relatively weak. It is therefore possible to use the one-loop old value of $Pr_T$ in a real-time, practical implementation, which means real-time iteration is avoided.

The turbine isentropic efficiency data stored in table 76 ("Table3") is preferably populated with data in advance of real-time execution by controller 14. In one embodiment, the data for table 76 ("Table3") may be obtained by the indirect measurement of turbine isentropic efficiency $\eta_T$ from equation (14) below, by obtaining 1) measurements of $T_{C,in}$, $T_{T,in}$, $P_{C,in}$, $P_{C,out}$, $P_{T,in}$, $P_{T,out}$, $\dot{m}_C$; 2) $\dot{m}_T$ from the indirect method described below in the section "Turbine and waste-gate flow indirect measurement method"; and 3) $\eta_C$ from reference to the compressor characteristics data provided by the turbo manufacturer. Additionally, the turbine pressure ratio $Pr_T$ may be calculated from measurements of $P_{T,in}$, $P_{T,out}$, and the compressor pressure ratio $Pr_C$ may be calculated from measurements of $P_{C,in}$, $P_{C,out}$.

Since a model of the turbine inlet temperature $T_{T,in}$, which is the exhaust manifold temperature $T_{EM}$, may be determined by electronic controller 14 via conventional approaches (i.e., its value is typically already available within a conventional engine management system executing on electronic controller 14) and in any event is not unique for a turbo-charged engine, equation (3) represents one equation expressed in two unknown variables, namely, $\dot{m}_T$ and $Pr_T$.

Figure 3:
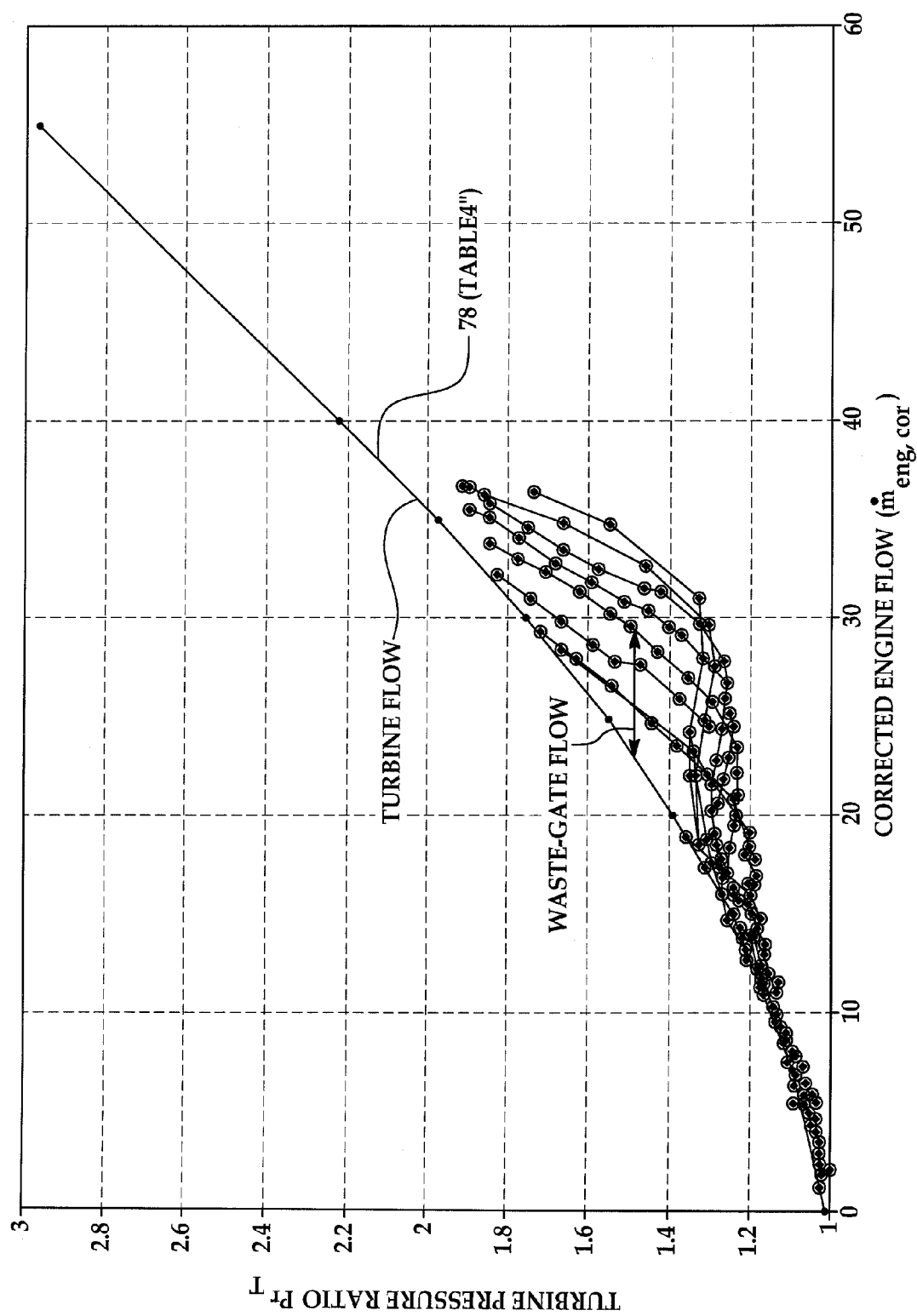
FIG. 3 is a diagram showing turbine pressure ratio as a function of corrected engine flow.

FIG. 3 is a chart showing turbine pressure ratio $Pr_T$ as a function of corrected engine flow. The following empirical relationship (i.e., equations (5) and (6)) for a turbine shown in FIG. 3 was found in Müller, M., et al., "Mean Value Modelling of Turbocharged Spark Ignition Engines", Society of Automotive Engineers (SAE) Technical Paper, no. 980784, International Congress and Exposition, Detroit, Mich., USA, Feb. 23-26, 1998, incorporated by reference herein in its entirety.

$$Pr_T = \text{Table4}(\dot{m}_{T,cor}) \quad (5)$$

Where $$\dot{m}_{T,cor} = \dot{m}_T \frac{\sqrt{T_{T,in}}}{P_{T,out}} \quad (6)$$

It should be appreciated that it effectively has no turbine rotational speed dependency on the relationship between flow and pressure ratio.

The pressure ratio/corrected engine flow data table 78 (i.e., the "Table4" in equation (5)) may be populated with values in advance of real-time execution by electronic controller 14 using measurements of $P_{T,in}$, $P_{T,out}$, $T_{T,in}$ and $\dot{m}_{eng}$, where $\dot{m}_T = \dot{m}_{eng}$ is used for all data points where the waste-gate and EGR valve are closed. More specifically, first measuring $P_{T,in}$, $P_{T,out}$, $T_{T,in}$ and $\dot{m}_{eng}$ test data. Then generating a first set of data-pairs for turbine pressure ratio ($Pr_T$) and corrected engine mass flow rate ($\dot{m}_{eng,cor}$) using the measured test data. This would involve converting measured $\dot{m}_{eng}$ to $\dot{m}_{eng,cor}$ using the form of equation (6) but substituting engine flow rate for turbine flow rate. Then, generating a second set of data-pairs for turbine pressure ratio ($Pr_T$) and corrected turbine mass flow rate ($\dot{m}_{T,cor}$) from the first set of data pairs wherein the second set of data-pairs is indicative of conditions where the waste-gate valve would be closed. And finally, populating the data table 78 ("Table4") with the second set of data-pairs. Such conditions would include the values for the turbine pressure ratio ($Pr_T$), for a given corrected turbine mass flow rate ($\dot{m}_{T,cor}$) would always be equal to or greater than the turbine pressure ratio ($Pr_T$) for the same value $\dot{m}_{eng,cor}$ (i.e., from the first set of data pairs). One would understand that this data in table 78 represent a smooth and continuous shape (e.g., as shown in FIG. 3).

It warrants emphasizing that equations (3) and (5) now represent two equations expressed in two unknowns.

Furthermore, rearranging equation (3) and combining with equation (6) gives equation (7) set forth below:

$$\left(\frac{P_C}{\eta_T c_p^e T_{T,in}}\right) * \left(\frac{\sqrt{T_{T,in}}}{P_{T,out}}\right) = \dot{m}_{T,cor}[1-(Pr_T)^{((1-k_{exh})/k_{exh})}] \quad (7)$$

For increased ease in making reference to equation (7), two new variables A, B are introduced, as set forth in equation (8) below.

$$A = \left(\frac{P_C}{\eta_T c_p^e T_{T,in}}\right), B = \frac{\sqrt{T_{T,in}}}{P_{T,out}} \quad (8)$$

Where

A is a Turbo Power Term; and

B is a Turbine Boundary Term.

Substituting new variables A and B of equation (8) into equation (7) results in a rewritten equation, designated as equation (9) below:

$$A*B = \dot{m}_{T,cor}[1-(Pr_T)^{((1-k_{exh})/k_{exh})}] \quad (9)$$

Equation (5), making use of data table 78 ("Table4"), shows that there is a unique relationship between $\dot{m}_{T,cor}$ and $Pr_T$, and equation (9) therefore stands for the proposition that a given product (A*B) describes one such unique combination of $\dot{m}_{T,cor}$ and $Pr_T$. It is therefore possible to directly tabulate the relationship between (A*B) and $\dot{m}_{T,cor}$ in a further table, namely turbine power and boundary term data table 80 ("Table5") as set forth in equation (10) below.

$$\dot{m}_{T,cor} = \text{Table5}(A*B). \quad (10)$$

Table 80 may be populated with values in advance of real-time execution by controller 14 (i.e., can be calculated off-line) using data table 78 ("Table4"), by calculating $Pr_T$ from equation (5) using an array of $\dot{m}_{T,cor}$, and then calculating the corresponding (A*B) values from equation (9).

The foregoing provides a framework that is compact and efficient and thus provides a particularly advantageous and suitable model for a real-time implementation in controller 14 for estimating the exhaust state parameters $\dot{m}_T$, $\dot{m}_{WG}$ and $Pr_T$.

Figure 4:
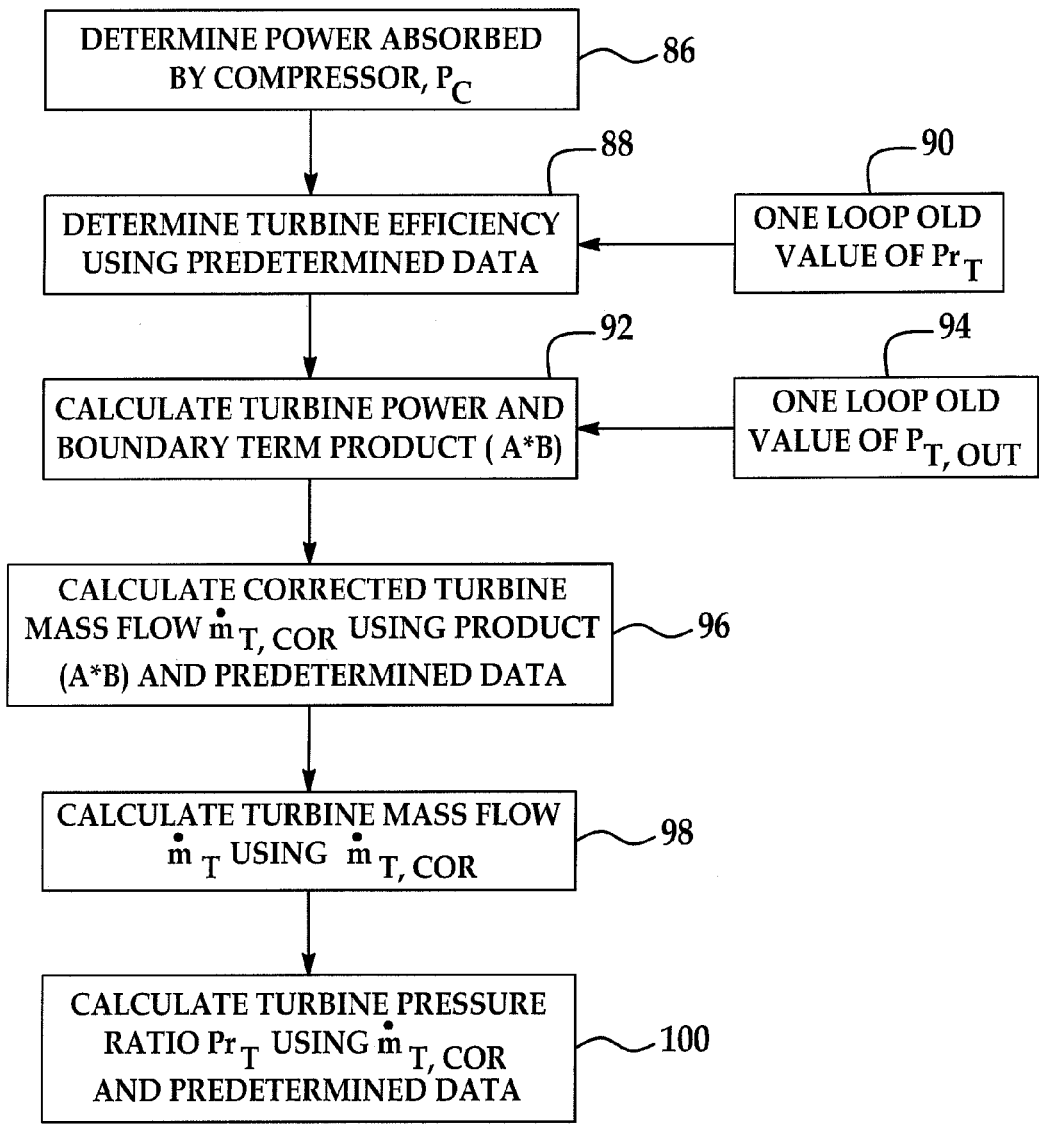
FIG. 4 is a flowchart diagram showing a method of estimating exhaust parameters in accordance with the present invention.

FIG. 4 is a simplified flowchart of an inventive method of estimating exhaust gas parameters in a turbo-charger equipped internal combustion engine 12. It should be understood that the method to be described in the steps 86 through 100 below define a single "loop" that provides updated values of the various exhaust gas parameters each time the "loop" is executed by controller 14. At various steps in the method, however, input data is used that is "one loop old" which refers to values from the previous "loop" or execution of the steps, as would be understood by one of ordinary skill in the art. With this background, the method begins in step 86.

In step 86, the electronic controller 14 generates a value corresponding to the power $P_C$ absorbed by the compressor 16. Controller 14 is configured to generate this value of $P_C$, as described above, by evaluating the equations (1a) and (1c) through (1h) using various sensed input values, estimated values and predetermined data, all as described above in detail. The method then proceeds to step 88.

In step 88, the electronic controller 14 determines a value for the turbine isentropic efficiency, $\eta_T$, using the simplified relationship expressed in equation (4), and further using a previous value of the turbine pressure ratio, $Pr_T$ from block 90. In a preferred embodiment, the value of $Pr_T$ is one loop old. The method then proceeds to step 92.

In step 92, the electronic controller 14 calculates the turbo power term A and the turbine boundary term B using equation (8) and a previous value of the turbine outlet pressure $P_{T,out}$ from block 94. In a preferred embodiment, the value of $P_{T,out}$ is one loop old. The controller 14 then calculates the product of terms A and B, namely, (A*B), through conventional processing. The method then proceeds to step 96.

In step 96, the electronic controller 14 calculates a value for the corrected turbine mass flow rate, $\dot{m}_{T,cor}$, using the product (A*B) from step 92 as an input value into table 80 ("Table5") as per equation (10). The method then proceeds to step 98.

In step 98, the electronic controller 14 calculates a value for the turbine mass flow rate, $\dot{m}_T$ using the value for $\dot{m}_{T,cor}$ from step 96 and equation (6). The method then proceeds to step 100.

In step 100, the electronic controller 14 calculates a value for the turbine pressure ratio, $Pr_T$ using the value for $\dot{m}_{T,cor}$ from step 96 as an input into table 78 ("Table4") as per equation (5).

In the above methodology, $P_{T,out}$ is assumed known as this may be described by conventional models of the pressure drop across the catalyst and muffler, which opens to atmosphere (i.e., the ambient pressure at tailpipe exit opening 40—best shown in FIG. 1). For completeness, equations (11a) and (11b) below may be used by electronic controller 14 to produce a value for the turbine outlet pressure $P_{T,out}$. The pressure drop data table 82 ("Table6"), best shown in FIG. 1, contains predetermined data characterizing the pressure drop characteristics of catalyst/muffler restriction 38 as a function of flow. A previous value, preferable a one loop old value of $T_{T,out}$, may be used in a real-time implementation of the methodology by electronic controller 14.

$$tmp = \frac{\dot{m}_{exh}\sqrt{R*T_{T,out}}}{P_{amb}*\text{Calibration1}} \quad (11a)$$

$$P_{T,out} = P_{amb}*\text{Table6}(tmp) \quad (11b)$$

Where tmp is a temporary variable, and

Calibration1 is a scaling calibration value selected so that the variable "tmp" is within the bounds or limits established for Table6.

Deduction of $T_{T,out}$.

Part of the exhaust gas flows through the turbine across which the temperature drops as the expansion process is converted into absorbed power of the turbine. The other part of the exhaust gas which flows through the waste-gate path does not experience a temperature drop. Furthermore, due to the high flows and turbulence levels in the turbine and waste-gate path, a temperature drop is caused by convective heat transfer to the turbine and waste-gate housing. Therefore the model for the turbine outlet temperature is a mixing model of the outlet temperatures from the turbine and waste-gate plus the heat transfer model, expressed in equations (12a), (12b) and (12c) below:

$$tmp = 1 - \eta_T\left(1 - \left(\frac{P_{T,out}}{P_{T,in}}\right)^{((k_{exh}-1)/k_{exh})}\right) \quad (12a)$$

$$T_{T,out,w/o\,HT} = T_{T,in}*\left(tmp\frac{\dot{m}_T}{\dot{m}_{exh}} + \frac{\dot{m}_{WG}}{\dot{m}_{exh}}\right) \quad (12b)$$

$$T_{T,out} = T_{amb} - (T_{amb} - T_{T,out,w/oHT})\text{Table7}(\dot{m}_{exh}) \quad (12c)$$

Where tmp is a temporary variable, and

"Table7" corresponds to heat transfer calibration data table 84. Heat transfer calibration data table 84 is preferably populated with data in advance of real time execution by controller 14. Table 84 ("Table7") may be populated by obtaining: 1) measurements of: $T_{amb}$, $T_{T,in}$, $T_{T,out}$, $P_{T,in}$, $P_{T,out}$, $\dot{m}_{exh}$; 2) $\dot{m}_T$, $\dot{m}_{WG}$ from the methods described below in the section "Turbine and waste-gate flow indirect measurement method"; 3) $\eta_T$ either from method described below in the section "Turbine isentropic efficiency indirect measurement method" or set as a reasonable constant value, e.g. 55%. Rearranging equations (12a)-(12*c*) in order to isolate "Table7", the value of Table7 can be calculated for each data point based on the data gathered, as described in 1), 2) and 3). Table 84 ("Table7") can now be tabulated with that data. In sum, the heat transfer data in table 84 ("Table7") may be calibrated by fitting the model to the measured $T_{T,out}$.

Turbine and Waste-Gate Flow Indirect Measurement Method

A benefit of the exhaust state estimation model is that it also represents methods for indirectly measuring both (1) turbine flow $\dot{m}_T$ and (2) waste-gate valve flow $\dot{m}_{WG}$. For clarification, these indirect measurement methods are conducted off-line, which is different than the method for modeling performed in real-time by the electronic controller. These indirect methods may be useful for populating various calibration tables referred to herein. The waste-gate valve flow will be described first.

FIG. 3 and equation (5) describe the relationship between $Pr_T$ and $\dot{m}_{T,cor}$, which is calibrated for the data points when the waste-gate valve (e.g., waste-gate valve 24 in FIG. 1) is closed. The data points for an open waste-gate valve, however, will deviate from this calibration. Inverting equation (5), gives equation (13) below.

$$\dot{m}_T^{cor} = \text{Table4}^{-1}(Pr_T) \quad (13)$$

Equation (6) may be used to convert $\dot{m}_{T,cor}$ to $\dot{m}_T$.

A value for $\dot{m}_T$ may then be used to obtain the waste-gate valve flow rate $\dot{m}_{WG} = \dot{m}_{exh} - \dot{m}_T$ where $\dot{m}_{exh} = \dot{m}_{eng} - \dot{m}_{EGR}$.

This means that measurements of $P_{T,in}$, $P_{T,out}$, $T_{T,in}$ and $\dot{m}_{eng}$ is all that is required to measure the turbine flow $\dot{m}_T$ and waste-gate valve flow $\dot{m}_{WG}$.

Turbine Isentropic Efficiency Indirect Measurement Method

The above section "Turbine and waste-gate flow indirect measurement method" described how to measure $\dot{m}_T$. By combining equations (1a), (1b) and (3) and rearranging, an equation (14) for the turbine isentropic efficiency $\eta_T$ is obtained:

$$\eta_T = \frac{1}{\eta_C} \frac{\dot{m}_C}{\dot{m}_T} \frac{c_{p,air}}{c_{p,exh}} \frac{T_{C,in}}{T_{T,in}} \frac{[(Pr_C)^{(k_{air}-1)/k_{air}} - 1]}{[1 - (Pr_T)^{(1-k_{exh})/k_{exh}}]} \quad (14)$$

This method of indirect measurement is useful, for example, for populating calibration table 76 (FIG. 1) in order to enable operation of the present method for estimating various exhaust parameters. As described above, the data for table 76 of FIG. 1 ("Table3") may be obtained by the indirect measurement of turbine isentropic efficiency $\eta_T$ from equation (14) above, by obtaining 1) measurements of $T_{C,in}$, $T_{T,in}$, $P_{C,out}$, $P_{T,in}$, $P_{T,out}$, $\dot{m}_C$; 2) $\dot{m}_T$ from the indirect method described above in the section "Turbine and waste-gate flow indirect measurement method"; and 3) $\eta_C$ from reference to the compressor characteristics data provided by the turbo manufacturer. Additionally, the turbine pressure ratio $Pr_T$ may be calculated from measurements of $P_{T,in}$, $P_{T,out}$, and the compressor pressure ratio $Pr_C$ may be calculated from measurements of $P_{C,in}$, $P_{C,out}$.

Note, that this method of measuring turbine isentropic efficiency means that the turbo mechanical efficiency will be included in $\eta_T$.

The present invention provides a system and method for modeling a turbo-charged internal combustion engine suitable for real-time implementation in an electronic controller of an automotive vehicle. The invention provides a model for various exhaust states such as $P_{T,in}$, $P_{T,out}$, $T_{T,out}$, $\dot{m}_T$ and $\dot{m}_{WG}$ that is dependent only on normal operating values available in a conventionally-configured automotive controller and one or more measured intake side parameters such as $P_{amb}$, $P_{Boost}$, $T_{amb}$ and $\dot{m}_C$ and/or $\dot{m}_{eng}$.

The present invention reflects a high-level application of energy conservation between the turbine (generated power) and compressor (absorbed power) of the turbo-charger for steady-state conditions with the power equation for compressible fluid compression and expansion resulting in equation (3).

It warrants emphasizing that the simple solution provided by the present invention in turn refers to the simple relationship of equation (5) and FIG. 3 and the way it is utilized with equation (3) to effectively convert an implicit solution of two equations with two unknowns to a real-time non-iterative solution form.

Moreover, the solution provided by the present invention involves the use of an adequately simple model of turbine isentropic efficiency $\eta_T$ that has a sufficiently weak dependency and well defined range to allow a run-time value thereof to be looked-up from a table or the like as a function of a previously generated (e.g., a one loop old value) value of $Pr_T$, which allows a simple and explicit mechanism to solve for $\eta_T$ in practical embodiments, and an indirect method for measurement of turbine flow and turbine isentropic efficiency. This feature of the present invention thus avoids the need of any turbine data required from the turbo-charger manufacturer.

Additionally, systems and methods in accordance with the invention operate quite well during transients, notwithstanding that some of the underlying derivations were made using steady-state assumptions.

The present invention also provides a method to indirectly measure waste-gate valve flow using only simple $P_{T,in}$, $P_{T,out}$, $T_{T,in}$ and $\dot{m}_{eng}$ measurements. This feature of the invention works for all waste-gate actuator types (e.g., passive and active, pneumatic and electrical) and does not require any measurement of the waste-gate valve position or exhaust states.

Moreover, the system and method for modeling also handles turbo-charged engines with both waste-gate and variable geometry turbine (VGT) configurations. For VGT embodiments according to the invention, all that is required is to add a VGT position dependency to data tables 76, 78 and 80 (i.e., "Table3", "Table4" and "Table5").

Additionally, it should be understood that electronic controller 14 as described above may include conventional processing apparatus known in the art, capable of executing pre-programmed instructions stored in an associated memory, all performing in accordance with the functionality described herein. That is, it is contemplated that the processes described herein will be programmed in a preferred embodiment, with the resulting software code being stored in the associated memory. Implementation of the present invention, in software, in view of the foregoing enabling description, would require no more than routine application of programming skills by one of ordinary skill in the art. Such an electronic controller may further be of the type having both ROM, RAM, a combination of non-volatile and volatile (modifiable) memory so that the software can be stored and yet allow storage and processing of dynamically produced data and/or signals.

It is to be understood that the above description is merely exemplary rather than limiting in nature, the invention being limited only by the appended claims. Various modifications and changes may be made thereto by one of ordinary skill in the art, which embody the principles of the invention and fall within the spirit and scope thereof.

Chart 1 correlates the various symbols/terms with its description:

CHART 1

| Symbol | Description |
| --- | --- |
| R | Gas constant |
| $k_{air}$ | Ratio of specific heats, air |
| $k_{exh}$ | Ratio of specific heats, exhaust |
| $c_{p,air} = c_p^a$ | Specific heat at constant pressure, air |
| $c_{p,exh} = c_p^e$ | Specific heat at constant pressure, exhaust |

CHART 1-continued

| Symbol | Description |
| --- | --- |
| Baro | Barometric pressure |
| $P_{amb}$ | Ambient pressure |
| $P_{C,in}$ | Compressor inlet stagnation pressure |
| $P_{C,in}^{reference}$ | Reference compressor inlet stagnation pressure (from turbo manufacturers data) |
| $P_{C,out}$ | Compressor outlet stagnation pressure |
| $P_{Boost}$ | Boost pressure (after intercooler, before throttle) |
| $P_{EM} (=P_{T,in})$ | Exhaust manifold stagnation pressure |
| $P_{T,in} (=P_{EM})$ | Turbine inlet stagnation pressure |
| $P_{T,out}$ | Turbine outlet stagnation pressure |
| $\Delta P_{Airfilter}$ | Airfilter pressure drop |
| $\Delta P_{Intercooler}$ | Intercooler pressure drop |
| $Pr_C$ | Compressor pressure ratio |
| $Pr_T$ | Turbine pressure ratio |
| $Pr_{exh}$ | Exhaust system pressure ratio (catalyst, muffler) |
| $T_{amb}$ | Ambient air temperature |
| $T_{C,in} (\cong T_{amb})$ | Compressor inlet air stagnation temperature |
| $T_{C,in}^{reference}$ | Reference compressor inlet air stagnation temperature (from turbo manufacturers data) |
| $T_{EM} (=T_{T,in})$ | Exhaust manifold gas stagnation temperature |
| $T_{T,in} (=T_{EM})$ | Turbine inlet stagnation temperature |
| $T_{T,out}$ | Turbine outlet stagnation temperature |
| $T_{T,out,w/o HT}$ | Turbine outlet stagnation temperature not accounting for heat loss |
| $\dot{m}_C$ | Compressor mass flow rate |
| $\dot{m}_T$ | Turbine mass flow rate |
| $\dot{m}_{T,cor}$ | Corrected turbine mass flow rate |
| $\dot{m}_{eng}$ | Engine mass flow rate |
| $\dot{m}_{eng,cor}$ | Corrected engine mass flow rate |
| $\dot{m}_{WG}$ | Waste-gate mass flow rate |
| $\dot{m}_{exh}$ | Exhaust system mass flow rate |
| $\dot{m}_{EGR}$ | EGR mass flow rate |
| $\dot{V}_{C,cor}$ | Corrected compressor volume flow rate |
| $\eta_C$ | Compressor isentropic efficiency |
| $\eta_T$ | Turbine isentropic efficiency |
| $P_C$ | Power absorbed by compressor |
| $P_T$ | Power produced by turbine |
| $\Delta h_C$ | Compressor enthalpy delta |
| $\dot{N}_{T,cor}$ | Corrected turbo-charger rotational speed |
| VE | Volumetric efficiency |
| $A = \left(\dfrac{P_C}{\eta_T c_p^e T_{T,in}}\right)$ | Turbo Power Term (home made word) |
| $B = \dfrac{\sqrt{T_{T,in}}}{P_{T,out}}$ | Turbine Boundary Term (home made word) |

The invention claimed is:

1. A method for calculating a real-time estimated exhaust state in an internal combustion engine having a turbo-charger with a compressor and an exhaust driven turbine with a waste-gate flow path that bypasses the turbine in a parallel path, comprising the steps of:
providing a controller in electrical connection to the engine and configured to calculate the real-time estimated exhaust state of the engine;
measuring intake parameter values of the engine with the controller;
determining a power level ($P_c$) absorbed by the compressor with the controller using at least one of the measured intake parameter values;
determining a product term (A*B) with the controller, wherein said product term (A*B) includes a turbine power term (A) having the determined power level ($P_c$) and a turbine boundary term (B) having a turbine outlet pressure ($P_{T,out}$); and
calculating the real-time estimated exhaust state of the engine with the controller using the determined product term (A*B), wherein the real-time estimated exhaust state is used to control operating performance of the internal combustion engine.

2. The method of claim 1 wherein the measuring intake parameter values step further includes at least one of an ambient air pressure, an ambient air temperature, and a boost pressure.

3. The method of claim 2 wherein the measuring intake parameter values step further includes an air mass flow rate.

4. The method of claim 3 wherein the measuring intake parameter values step including the air mass flow rate further includes the step of:
estimating a value for the air mass flow rate in accordance with a speed-density function with the controller.

5. The method of claim 3 wherein the measuring intake parameter values step including the air mass flow rate further includes the step of:
measuring a value for the air mass flow rate using an air flow sensor with the controller.

6. The method of claim 1 wherein the real-time estimated exhaust state of the engine is one of a turbine inlet pressure ($P_{T,in}$), a turbine outlet pressure ($P_{T,out}$), a turbine pressure ratio ($Pr_T$), a turbine outlet temperature ($T_{T,out}$), a turbine mass air flow ($\dot{m}_T$) and a waste-gate mass flow rate ($\dot{m}_{WG}$).

7. The method of claim 1 wherein the step of providing the controller further includes providing data tables disposed in a memory of the controller, and said data tables including data values measured for a plurality of engine system operating conditions associated with the engine, and the data tables comprising a predetermined compressor enthalpy delta table, a predetermined turbo corrected speed data table, a predetermined turbine efficiency ($\eta_T$) data table, a predetermined turbine pressure ratio/corrected engine flow data table, a predetermined product term (A*B) data table, a predetermined pressure data drop-exhaust system data table, and a predetermined heat transfer calibration table, and the controller accesses at least one of the data tables after the step of providing the controller and prior to the step of calculating the real-time estimated exhaust state.

8. The method of claim 1 wherein the turbine power term is defined as $$A = \left(\frac{P_C}{\eta_T c_p^e T_{T,in}}\right)$$

where
A Turbine Power Term,
$P_c$=power absorbed by the compressor,
$\eta_T$=Turbine Isentropic Efficiency,
$c_p^e$=specific heat at constant pressure for exhaust
$T_{T,in}$=Turbine Inlet Temperature;
and the turbine boundary term is defined as $$B = \frac{\sqrt{T_{T,in}}}{P_{T,out}}$$

where
B=Turbine Boundary Term,
$T_{T,in}$=Turbine Inlet Temperature,
$T_{T,out}$=Turbine Outlet Pressure.

9. A method for calculating a real-time estimated turbine pressure ratio ($Pr_T$) exhaust state in an internal combustion engine system having a turbo-charger with a compressor and an exhaust driven turbine, comprising the steps of:

providing a controller in electrical connection to the engine and configured to calculate the real-time estimated turbine pressure ratio ($Pr_T$) exhaust state, and the controller including a first mathematical model stored in a memory in the engine and having a corrected turbine mass flow rate ($\dot{m}_{T,cor}$) in mathematical relationship to a turbine pressure ratio ($Pr_T$), and a second mathematical model stored in the memory in the engine having a product term (A*B), said product term (A*B) including a turbine power term (A) containing a determined power level ($P_c$) and a turbine boundary term (B) containing a turbine outlet pressure ($P_{T,out}$), and the product term (A*B) being in mathematical relation to a corrected turbine mass flow rate ($\dot{m}_{T,cor}$);

measuring intake parameter values of the engine with the controller;

determining the power level (Pc) absorbed by the compressor with the controller using predetermined compressor characteristics data and the measured intake parameter values;

determining a value for the product term (A*B) with the controller using the determined power level ($P_c$);

determining a value for the corrected turbine mass flow rate ($\dot{m}_{T,cor}$) with the controller using the second mathematical model and the determined value for the product term (A*B); and determining a value for the turbine pressure ratio ($Pr_T$) with the controller using the first mathematical model using the determined corrected turbine mass flow rate ($\dot{m}_{T,cor}$) value, wherein the real-time estimated turbine pressure ratio ($Pr_T$) exhaust state is used to control operating performance of the internal combustion engine.

10. The method of claim 9 wherein the step of determining the power level ($P_c$) includes the sub-steps of:

establishing a third mathematical model in the memory where corrected compressor volume flow rate ($\dot{V}_{C,cor}$) and a compressor pressure ratio (Prc) are in mathematical relation to a corrected turbo-charger rotational speed ($\dot{N}_{T,cor}$);

establishing a fourth mathematical model in the memory where a corrected compressor volume flow rate ($\dot{V}_{C,cor}$) and corrected turbo-charger rotational speed ($\dot{N}_{T,cor}$) are in mathematical relation to compressor enthalpy delta ($\Delta h_c$);

determining the absorbed power ($P_c$) using the third and fourth mathematical model with the controller data structures.

11. The method of claim 9 further including the step of:

establishing a turbine efficiency mathematical model in the memory where a turbine pressure ratio ($Pr_T$) is in mathematical relation with a turbine isentropic efficiency ($\eta_T$);

wherein said step of determining the product term (A*B) with the controller includes the sub-step of determining a value for the turbine isentropic efficiency ($\eta_T$) with the controller using the turbine efficiency mathematical model.

12. The method of claim 11 wherein the turbo-charger includes a variable geometry turbine (VGT), and each of said first mathematical model and said second mathematical model and said turbine efficiency mathematical model further correlate a VGT position dependency for the VGT with the controller, and the correlated VGT position dependency comprises use of the turbine pressure ratio ($Pr_T$), the corrected turbine mass flow rate ($\dot{m}_{T,cor}$), and the turbine isentropic efficiency ($\eta_T$), respectively.

13. The method of claim 11 wherein said steps of determining respective values for the turbine isentropic efficiency ($\eta_T$), for the product (A*B), for the corrected turbine mass flow rate ($\dot{m}_{T,cor}$), and for the turbine pressure ratio ($Pr_T$) are performed with the controller to provide current values for a current execution loop;

wherein said step of determining a value for the turbine isentropic efficiency ($\eta_T$) with the controller is performed using a previous value for the turbine pressure ratio ($Pr_T$) associated with a previous execution loop; and wherein said step of determining a value for the product term (A*B) with the controller is performed using a previous value for the turbine outlet pressure ($P_{T,out}$) associated with the previous execution loop.

14. The method of claim 9 further including the step of:

determining a value for the turbine mass flow rate ($\dot{m}_T$) with the controller using a corrected turbine mass flow rate ($\dot{m}_{T,cor}$), a turbine inlet temperature ($T_{T,in}$), and turbine outlet pressure ($P_{T,out}$).

15. The method of claim 14 further including the step of:

determining a value for the waste-gate mass flow rate ($\dot{m}_{WG}$) with the controller using the turbine mass flow rate ($\dot{m}_T$) value.

16. The method of claim 15 wherein the step of determining the value of the waste-gate mass flow rate ($\dot{m}_{WG}$) includes the sub-step of:

subtracting the turbine mass flow rate ($\dot{m}_T$) value from an exhaust system mass flow rate ($\dot{m}_{exh}$) with the controller to obtain the waste-gate mass flow rate ($\dot{m}_{WG}$) value.

17. The method of claim 16 wherein the exhaust system mass flow rate ($\dot{m}_{exh}$) is determined with the controller as a function of the engine mass flow rate $\dot{m}_{eng}$ and the exhaust gas recirculation (EGR) mass flow rate ($\dot{m}_{EGR}$).

18. The method of claim 9 further comprising the step of:

determining a turbine outlet temperature ($T_{T,out}$) with the controller.

19. The method of claim 18 wherein said step of determining a turbine outlet temperature $T_{T,out}$ with the controller includes the sub-steps of:

establishing a heat transfer calibration mathematical model in the memory where an exhaust system mass flow rate ($\dot{m}_{exh}$) is in mathematical relation to with turbine outlet temperature ($T_{T,out}$).

20. The method of claim 9 wherein said first mathematical model is populated with data corresponding to a condition where the waste-gate flow path is closed.

21. The method of claim 9 wherein the measuring intake parameter values step with the controller further includes the intake parameter values comprising at least one of an ambient air pressure, an ambient air temperature, a boost pressure, and an air mass flow rate.

22. A method for indirect measurement of a turbine mass flow rate ($\dot{m}_T$) in an internal combustion engine system having a turbo-charger with a compressor and an exhaust driven turbine with a waste-gate flow path that bypasses the turbine in a parallel path, comprising the steps of:

providing an off-line controller configured to determine the turbine mass flow rate ($\dot{m}_T$);

measuring turbine operating parameters for a plurality of engine system operating conditions in the engine system, said measured turbine operating parameters including a turbine inlet pressure ($P_{T,in}$), a turbine outlet pressure ($P_{T,out}$), a turbine inlet temperature ($T_{T,in}$) and an engine mass flow rate ($\dot{m}_{eng}$);

determining a corrected turbine mass flow rate ($\dot{m}_{T,cor}$) values for a selected turbine pressure ratio ($Pr_T$) with the off-line controller using the measured turbine operating parameters in a mathematical model stored in a memory and accessed by off-line controller where a turbine pressure ratio ($Pr_T$) is in mathematical relation to a corrected turbine mass flow rate ($\dot{m}_{T,cor}$);

converting the corrected turbine mass flow rate ($\dot{m}_{T,cor}$) values to the turbine mass flow rate ($\dot{m}_T$) values as a function of turbine outlet pressure ($P_{T,out}$) and turbine inlet temperature $T_{T,in}$ with the off-line controller;

measuring $P_{T,in}$, $P_{T,out}$, $P_{T,in}$, and $\dot{m}_{eng}$ for a plurality of engine system operating conditions in the engine system;

generating a first set of data-pairs for turbine pressure ratio ($Pr_T$) and corrected engine mass flow rate ($\dot{m}_{eng,cor}$) using the measured test data with the off-line controller;

generating a second set of data-pairs for turbine pressure ratio ($Pr_T$) and corrected turbine mass flow rate ($\dot{m}_{T,cor}$) from the first set of data pairs with the off-line controller, wherein the second set of data-pairs comprise the waste-gate valve being closed; and populating said second set of data-pairs in a data table in a memory disposed in the internal combustion engine, and the internal combustion engine includes an engine controller in electrical connection to the engine, and the engine controller accesses the data table having said second set of data-pairs to determine a real-time estimated exhaust state in the internal combustion engine.

23. The method of claim 22 further including the step of:

determining a value for the waste-gate mass flow rate ($\dot{m}_{WG}$) using the turbine mass flow rate ($\dot{m}_T$) value with the off-line controller.

24. The method of claim 23 wherein the step of determining the value of the waste-gate mass flow rate ($\dot{m}_{WG}$) includes the sub-step of:

subtracting the turbine mass flow rate ($\dot{m}_T$) value from an exhaust system mass flow rate ($\dot{m}_{exh}$) value to obtain the waste-gate mass flow rate ($\dot{m}_{WG}$) value with the off-line controller.

25. The method of claim 24 wherein the exhaust system mass flow rate ($\dot{m}_{exh}$) is determined with the off line controller as a function of the engine mass flow rate ($\dot{m}_{eng}$) and the exhaust gas recirculation (EGR) mass flow rate ($\dot{m}_{EGR}$).

26. The method of claim 22 wherein the step of determining the corrected turbine mass flow rate ($\dot{m}_{T,cor}$) values for a selected turbine pressure ratio ($Pr_T$) further includes the corrected turbine mass flow rate ($\dot{m}_{T,cor}$) being inversely mathematically proportional to the turbine pressure ratio ($Pr_T$).

27. A method for indirect measurement of an isentropic efficiency of a turbine $\eta_T$ of an internal combustion engine system having a turbo-charger with a compressor and an exhaust driven turbine with a waste-gate flow path that bypasses the turbine in a parallel path, comprising the steps of:

providing a first controller configured to characterize the isentropic efficiency of the turbine ($\eta_T$) for the engine system for a plurality of engine system operating conditions;

measuring operating parameters for the plurality of engine system operating conditions associated with the engine system, said operating parameters including a compressor inlet temperature ($T_{C,in}$), a compressor inlet pressure ($P_{C,in}$), a compressor outlet pressure ($P_{C,out}$), turbine inlet pressure ($P_{T,in}$), a turbine outlet pressure ($P_{T,out}$), a turbine inlet temperature ($T_{T,in}$) and a compressor mass flow rate ($\dot{m}_C$);

determining a corrected turbine mass flow rate ($\dot{m}_{T,cor}$) value for a selected turbine pressure ratio ($Pr_T$) with the first controller and the first controller using values from the measured operating parameters in a first mathematical model stored in a memory accessed by the first controller to derive the corrected turbine mass flow rate ($\dot{m}_{T,cor}$) and the turbine pressure ratio ($Pr_T$), and the first mathematical model including a turbine pressure ratio ($Pr_T$ and a corrected turbine mass flow rate ($\dot{m}_{T,cor}$), and data in the first mathematical model corresponds to a condition of the waste-gate flow path being closed;

converting the corrected turbine mass flow rate ($\dot{m}_{T,cor}$) value to a turbine mass flow rate ($\dot{m}_T$) value as a function of the turbine outlet pressure ($P_{T,out}$) and the turbine inlet temperature ($T_{T,in}$) with the first controller: and determining values for the turbine isentropic efficiency ($\eta_T$) over the plurality of engine system operating conditions with the first controller in accordance with a second mathematical model stored in the memory accessed by the first controller where the second mathematical model includes using a predetermined compressor characteristics map data, the turbine mass flow rate ($\dot{m}_T$) value, the turbine pressure ratio ($Pr_T$) value, a compressor pressure ratio ($Pr_c$) value, the compressor mass flow rate ($\dot{m}_C$) value, the compressor inlet temperature ($T_{C,in}$) value, and the turbine inlet temperature ($T_{T,in}$); and populating the determined turbine isentropic efficiency ($\eta_T$) values in a data table disposed in the memory of the internal combustion engine, and an engine controller being disposed in, and in electrical connection with the internal combustion engine, and the engine controller having access to the data table such that the turbine isentropic efficiency ($\eta_T$) values are used by the engine controller to calculate a real-time estimated exhaust state of the internal combustion engine.

* * * * *